(12) United States Patent
Said

(10) Patent No.: US 6,744,919 B2
(45) Date of Patent: Jun. 1, 2004

(54) CLASSIFICATION OF BLOCKS FOR COMPRESSION BASED ON NUMBER OF DISTINCT COLORS

(75) Inventor: Amir Said, Cupertino, CA (US)

(73) Assignee: Hewlett Packard Development Company, L.P., Houston, TX (US)

(*) Notice: Subject to any disclaimer, the term of this patent is extended or adjusted under 35 U.S.C. 154(b) by 159 days.

(21) Appl. No.: 09/912,005

(22) Filed: Jul. 24, 2001

(65) Prior Publication Data

US 2003/0021471 A1 Jan. 30, 2003

(51) Int. Cl.[7] .............................. G06K 9/00; G06K 9/36
(52) U.S. Cl. ..................... 382/166; 382/165; 382/194; 382/199; 382/224; 382/239; 382/243; 358/1.15
(58) Field of Search ................ 358/426.02, 426.04, 358/426.13, 426.14, 1.15, 462, 464, 539; 382/164–166, 192, 194, 199, 224, 232, 239, 243–246, 228

(56) References Cited

U.S. PATENT DOCUMENTS

| 5,422,736 A | * | 6/1995 | Katayama ................... 358/462 |
| 5,818,970 A | * | 10/1998 | Ishikawa et al. ............ 382/248 |
| 6,148,102 A | * | 11/2000 | Stolin ......................... 382/164 |
| 6,285,458 B1 | * | 9/2001 | Yada .......................... 358/1.15 |
| 6,456,404 B1 | * | 9/2002 | Furuya et al. .............. 358/523 |
| 6,477,269 B1 | * | 11/2002 | Brechner .................... 382/165 |
| 6,518,981 B2 | * | 2/2003 | Zhao et al. ................. 345/764 |

FOREIGN PATENT DOCUMENTS

| EP | 0286286 A1 | 10/1988 |
| EP | 0974933 A2 | 1/2000 |
| EP | 1001612 A1 | 5/2000 |

OTHER PUBLICATIONS

Amir Said and Alex Drukarev: "Simplified Segmentation for Compound Image Compression" Image Processing, 1999, ICIP 99 Proceedings, 1999 Intrernatioanl Confernece on KOBE.

Queiroz DE R L et al. "Optimizing Block–Thresholding Segmentation for Multilayer Compression of Compound Images" IEEE Transactions on Image Processing vol. 9Nov 9; Sep. 9, 2000.

Fletcher L A et al. "A Robust Algorithm for Text String Separation from Mixed text/graphic images" IEEE Tr. on Pattern Analysis and Machine Intelligence pp. 910–918.

* cited by examiner

Primary Examiner—Timothy M. Johnson

(57) ABSTRACT

An image of a compound document is processed by accessing a plurality of blocks of the image; and classifying the blocks for compression. At least some of the blocks are classified according to their numbers of distinct colors.

26 Claims, 3 Drawing Sheets

CLASSIFICATION OF BLOCKS FOR COMPRESSION BASED ON NUMBER OF DISTINCT COLORS

BACKGROUND

The present invention relates to digital images. More specifically, the present invention relates to compression of compound documents.

A hardcopy device such as a digital copier typically includes a scan engine for converting pages of documents into digital images, memory for storing the digital images, and a print engine for printing out the stored images. The memory is usually large enough to store at least one full digital image. By storing a full digital image in memory, the digital copier can print out multiple copies of the stored image.

Digital image compression is performed to reduce the memory and bandwidth requirements of the digital copier. Reducing the memory and bandwidth requirements, in turn, reduces the cost of the digital copier.

A single compression algorithm is usually not suitable for compressing compound documents. Compound documents may contain text, drawings and photo regions (sometimes overlaid), complex backgrounds (e.g., text boxes), watermarks and gradients. For example, magazines, journals and textbooks usually contain two or more of these features. Compression algorithms such as JPEG are suitable for compressing photo regions of the compound color documents, but they are not suitable for compressing black and white text regions of the compound color documents. These lossy compression algorithms are based on linear transforms (e.g., discrete cosine transform, discrete wavelet transform) and do not compress edges efficiently. They require too many bits, and may produce very objectionable artifacts around text.

Compression algorithms such as CCITT, G4 and JBIG are suitable for compressing black and white text regions of the compound color documents. However, they are not suitable for compressing photo regions of the compound color documents.

A typical solution is to pre-process the documents, separating the regions according to the type of information they contain. For instance, regions containing edges (e.g., regions containing text, line-art, graphics) and regions containing natural features (e.g., regions containing photos, color backgrounds and gradients) are separated and compressed according to different algorithms.

However, algorithms for separating the regions tend to be very complex, requiring large amounts of memory and high bandwidth. The complexity, high bandwidth and large memory requirements make many algorithms unsuitable for embedded applications such as digital copiers, printers, scanners and other hardcopy devices.

SUMMARY

According to one aspect of the present invention, a digital image (e.g., a digital image of a compound document) is processed by accessing a plurality of blocks of the digital image; and classifying each block for compression. At least some blocks are classified according to their number of distinct colors. Block size is substantially smaller than size of the digital image; therefore, bandwidth and memory requirements are reduced.

Other aspects and advantages of the present invention will become apparent from the following detailed description, taken in conjunction with the accompanying drawings, illustrating by way of example the principles of the present invention.

DETAILED DESCRIPTION

Figure 1:
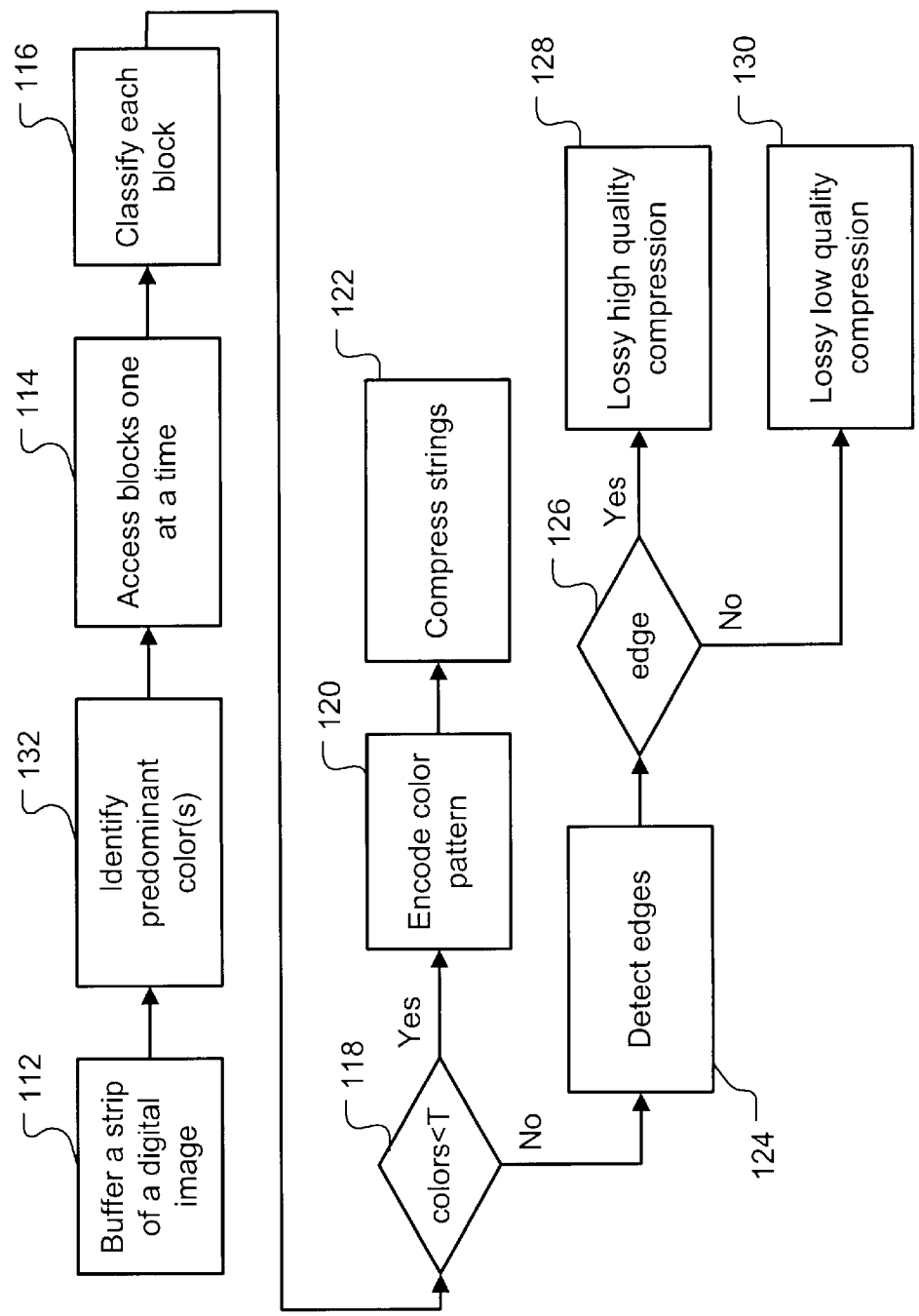
FIG. 1 is an illustration of a method for processing a digital image.

Reference is made to FIG. 1, which illustrates a method for processing a digital image. The digital image is made up of a plurality of pixels, each pixel represented by an n-bit word. In a typical 24-bit word representing RGB color space, for instance, eight bits represent a red component, eight bits represent a green component and eight bits represent a blue component.

The digital image is processed one strip at a time. Each strip contains a row of contiguous blocks. Each block contains a relatively small number of pixels relative to the number of pixels in the digital image. A typical block size may be 16×16 pixels or 32×32 pixels. The smaller blocks require less memory and result in better resolution. In practice, block size will be dictated by memory constraints on the hardcopy device.

Processing of a single strip will now be described. The strip is buffered (112) and blocks are accessed one at a time (114). For each block, the number of distinct colors is determined (116), and compared to a threshold number (118). A block having less than the threshold number of colors is likely to contain text or other computer-generated features. A block having as many as, or more than, the threshold number of colors is likely to contain a color gradient.

If a block has less than the threshold number of colors, its color pattern is encoded (120). Consider an example in which the threshold number is three and a block contains portions of black text and white background. The block has two distinct colors; therefore, its color pattern is encoded. The block may be encoded by assigning a value of '0' to white pixels and a value of '1' to black pixels. Thus a one-bit word may be used to encode each pixel of the block. Resulting from the encoding is a string of 0's and a string of 1's. Because a large portion of the processing burden is spent finding discrete colors, this simple approach greatly reduces the computational burden.

The strings of zeros and ones are compressed (122). Run length encoding or any suitable algorithm may be used to reduce the length of the strings of 0's and 1's.

A threshold number other than three may be used. The choice of a threshold will depend in part upon the resolution of the image. If the resolution is high, a color will change slowly, and each block might contain only two or three colors. Consider another example in which the threshold number is four and a block contains three distinct colors. The three colors are assigned values of one, two and three, whereby a two-bit word is used to encode each color. However, by limiting the threshold to two, each 24-bit or 32-bit word can be reduced to a single bit. Furthermore, the number of comparisons is lower and the complexity of the classification is lower.

If a block has more than the threshold number of distinct colors (118), edge detection is performed to classify the block (124). If an edge is detected, the block is placed in a class that will be encoded by a lossy high quality compression algorithm (128). If an edge is not detected, the block is likely to contain photographic or natural features and, therefore, is placed in a class that will be encoded by a lossy low quality compression algorithm (130).

The edge detection need not identify the location or orientation of an edge in a block; it merely needs to indicate the presence of an edge in a block. A preferred edge detection technique involves applying an entropy function to a block in order to detect the presence of an edge in the block. The preferred edge detection technique is disclosed in U.S. Ser. No. 09/912,278 filed July 24, 2001, which is incorporated herein by reference.

The lossy compression (128, 130) typically encodes each of the color components of the block into three separate streams.

Additional processing may be performed. For example, a predominant color in the buffered strip may be identified (132) before the blocks are processed. The predominant color of the buffered strip may be identified by performing a statistical analysis on a random sampling of pixels in the buffered strip. The predominant color may be added to header information and used by a decoder as the default color for decoding all of the blocks in the strip. In the alternative, a predominant color of one of the strips could be considered the predominant color of the entire image. Knowledge of the predominant color can lead to more efficient compression of the digital image.

Header information may be added to each block. For example, a first entry of a block header could indicate the threshold number of colors; a second entry could indicate whether the threshold was exceeded, and a third entry could indicate whether the block contains an edge.

Additional block header information could indicate the compression algorithm used to compress the block, and the spatial location of the block in the image. However, this entry for spatial location could be eliminated if the blocks are coded sequentially. The header entry for compression type could be eliminated if the type of compression is agreed upon by convention.

Header information may be added to each strip of blocks. Such header information may identify predominant colors.

The compressed blocks can be decoded with little to no overhead. The blocks are reconstructed with the same algorithms with which they were compressed. The header information in each block allows the compression algorithm to be identified and the reconstructed blocks to be re-arranged in their original spatial location in the document. For example, if the second header entry (whether the threshold number of colors is exceeded) is true and the third header entry (whether the block contains an edge) is also true, an agreed-upon lossy compression algorithm could be used to reconstruct a block. If the second entry is true and the third entry is false, a different agreed-upon lossy compression algorithm could be used to reconstruct a block. If the second entry is false, the block is decoded, and word length is derived from the first entry (for example, a threshold of three indicates that each color is encoded by a 1-bit word). Color information (e.g., '0'=black; '1'=white) may be derived from the block and strip headers.

There are different ways of determining the number of distinct colors in a block. Three examples follow.

Figure 2:
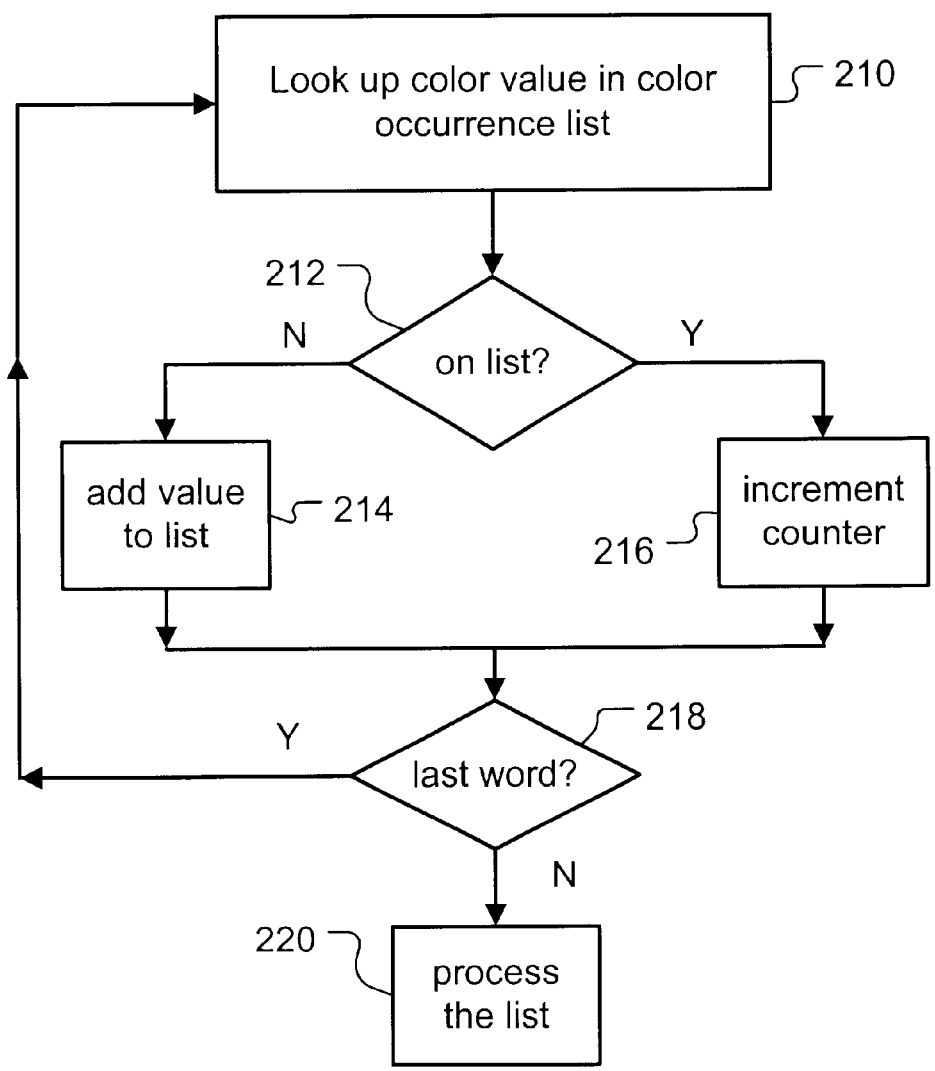
FIG. 2 is a method of identifying distinct colors in an image block.

The first example is shown in FIG. 2. The value of each n-bit word of the block is looked up in a color occurrence list (210). The list includes one or more entries [(R,G,B), q], where (R,G,B) is a color vector and q is the number of times that color vector is selected. If a color vector is not on the color occurrence list (212), that color vector is added to the list (214). If the color vector is already on the list (212), the count (q) of the color vector is incremented (216). After all words of the block have been identified (218), the list is processed (220). If the number of distinct colors is less than the threshold number, the number of colors on the list is encoded, and the distinct colors on the list are encoded. If not (for example, the block contains a color gradient), the list is discarded.

The second example is similar to the first example, except that the n-bit words are rounded off. An n-bit word may be rounded off, for example, by ignoring its least significant bits. This second example is useful for images having a lot of noise. It also reduces the size of the color occurrence list.

As a third example, the number of distinct colors is determined by dividing the color space into different "color bins," identifying colors in the block and assigning each identified color to a color bin. A color occurrence list is maintained to indicate the number of occurrences or hits for each bin. The number of distinct colors corresponds to the number of color bins that have been "filled" (a color bin may be considered filled if at least one of the identified colors falls within the range of that color bin). Thus, if a color space is divided into eight color bins, a first bin might cover pixel values from 0–31, a second bin might cover pixel values from 32–63, and so on. After all n-bit words of the block have been assigned to color bins, the color occurrence list is processed. Comparing the identified colors to color bins reduces the number of comparisons that are needed to determine the number of distinct colors, as well as reducing the size of the color occurrence list.

Figure 3:
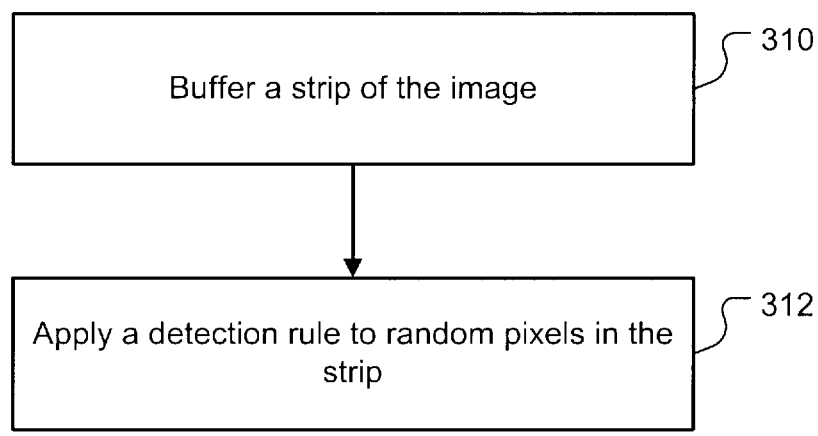
FIG. 3 is an illustration of a method for identifying a predominant color of the digital image.

Reference is now made to FIG. 3, which shows a method of identifying one or more predominant colors in each strip of the digital image. A strip of the image is buffered (310), and a detection algorithm is applied to a random sampling of pixels in the strip (312). The detection algorithm indicates one or more predominant colors in the strip.

The detection algorithm is based on three parameters: a true color ratio ($r_c$), an acceptable ratio ($r_a$) and a desirable ratio ($r_d$). The true color ratio ($r_c$) is the number of pixels having a specific color divided by the total number of pixels in the strip. The probability of detecting a predominant color is low if $r_c < r_a$, and the probability of detecting a predominant color is high if $r_c > r_d$. The difference between the acceptable ratio ($r_a$) and the desirable ratio ($r_d$) allows for a smooth transition in the detection probability.

The detection algorithm minimizes the probability of identifying a color having $r_c < r_a$ as a predominant color (a "false-positive" outcome"), and it minimizes the probability of not identifying a color having $r_c > r_d$ as a predominant color (a "false-negative" outcome").

The following exemplary detection algorithm may be used to create a color occurrence list.

1. The color occurrence list is reset (i.e., set as an empty list).
2. A first sampling $P_1$ of pixels is tested. If the color vector (R,G,B) of a pixel under test is in the color occurrence list, then the corresponding counter (q) is incremented by one. If the color vector of the pixel under test is not in the color occurrence list, the color vector is added to the list as a new entry of the list, and its counter q is set to one.
3. Additional samplings $P_n$ of pixels are tested, where n=2,3,4, . . . , N. The following steps are performed for each sampling:

(a) If the color vector of a pixel under test is in the color occurrence list, then its corresponding counter is incremented by one. If the color vector of the pixel under test is not in the color occurrence list, the color vector is added to the list as a new entry of the list, and its counter is set to one.

(b) At the end of the $n^{th}$ sampling, all entries with counter $q<T_n$ are removed from the list.

(c) If the color occurrence list is empty or all entries have a counter $q>U_n$ then the entries in the list are identified as the predominant colors. If $q \leq U_n$, control is returned to step (a) and another sampling is performed.

The number of pixel tests $P_n$ and the corresponding thresholds $T_n$ and $U_n$ are chosen so that no predominant color is removed from the list.

An optimal set of parameters $P_n$, $T_n$ and $U_n$ may be computed as follows. Probability functions $f(l,k,p)$ and $v(l,k,p)$ are defined as $$f(l, k, p) = \binom{k}{l} p^l (1-p)^{k-1} = \frac{k! p^l (1-p)^{k-1}}{l!(k-l)!}$$

$$v(l, k, p) = \sum_{i=0}^{l} f(i, k, p)$$

The probability that a color with $r_c \geq r_d$ is discarded at the $n^{th}$ step (step 3(b)) is determined not only by the number of occurrences, but also considering if it was not discarded in a previous step. The probability that a color vector is not discarded is $$B_d^n(r_c) = \sum_{T_{n-1}}^{T_{n-1}} \sum_{l=T_{n-1}}^{k} B_{n-1}(l, r_c) f(k-l, P_n, r_c)$$

After using this equation to compute $P_n$ and $T_n$, the probabilities can be updated using the following:

$$B_n(k, r_c) = \begin{cases} \sum_{l=T_{n-1}}^{k} B_{n-1}(l, r_c) f(k-l, P_n, r_c), & T_n \leq k \leq S_n \\ 0, & 0 \leq k < T_n \end{cases}$$

The probabilities of false-positive and false-negative decisions at step n are $$F_{FN}^n \leq B_d^n(r_d) \text{ and } F_{FN}^n \leq \sum_{k=U_n}^{S_n} B_n(k, r_a).$$

The probabilities of false-positive and false-negative decisions are bounded by $$F_{FP} \leq 1 - B_d^N(r_a) \text{ and } F_{FN} < B_d^N(r_d)$$

Thus the parameters may be determined by starting with initial values and adjusting the values until the desired probabilities occur.

Thus disclosed is a block-based method for compressing digital images containing both natural and computer-generated features. Memory requirements are relatively small, since decisions are made on relatively small image blocks. Bandwidth is relatively small since the blocks are processed in a single pass. Complexity is relatively low, as the number of operations per pixel is limited to only a few comparisons.

Figure 4:
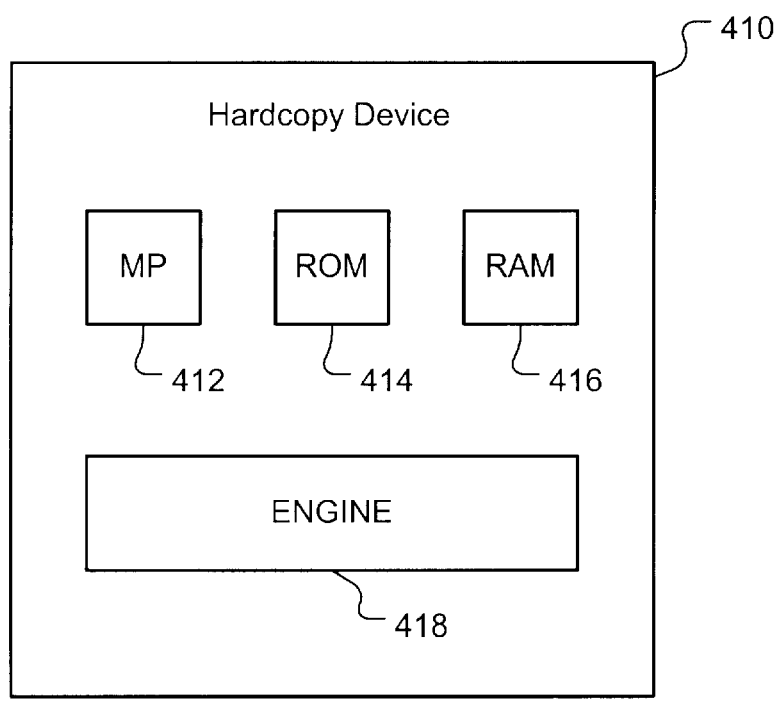
FIG. 4 is an illustration of a hardcopy device that implements the method of FIG. 1.

Reference is now made to FIG. 4, which shows a hardcopy device 410 that utilizes the method described above. The hardcopy device 410 includes a processor 412, read-only memory 414 and random access memory 416. The read-only memory 414 stores a program that, when executed, causes the processor 412 to process the digital image according to the method of FIG. 1. The random access memory 416 is used for buffering the strips and storing intermediate results of the processing (such as results from each compression block). The hardcopy device also includes an engine 418. In a digital copier, for example, the engine 418 would include a print engine and a scan engine.

The method is not limited to any particular hardcopy device. Exemplary hardcopy devices include digital copiers, printers, scanners, and all-in-one machines. The method is not limited to hardcopy devices; it may be implemented in any device that stores a digital image.

The present invention is not limited to the specific embodiments described and illustrated above. Instead, the present invention is construed according to the claims that follow.

What is claimed is:

1. A method of processing a digital image, the method comprising:

accessing a plurality of blocks of the digital image, block size being substantially smaller than digital image size;

classifying each block for compression, at least some of the blocks being classified according to their numbers of distinct colors; and performing edge detection on each block whose number of distinct colors exceeds a threshold.

2. The method of claim 1, wherein the number of distinct colors in a block is determined by determining the number of distinct color vectors in the block.

3. The method of claim 1, wherein the number of distinct colors in a block is determined by determining the number of distinct truncated color vectors in the block.

4. The method of claim 1, wherein the number of distinct colors in a block is determined by determining the number of bins filled with color vectors.

5. The method of claim 1, wherein the method further comprises coding a color pattern of a block if the threshold is not exceeded.

6. The method of claim 1, wherein a block is classified for lossy high quality compression if the threshold is exceeded and an edge is detected, the block being classified for lossy low quality compression if the threshold is exceeded and at least one edge is not detected.

7. The method of claim 1, wherein the edge detection on a block is performed by determining an entropy of differences in the block.

8. The method of claim 1, further comprising identifying at least one predominant color in a strip of blocks prior to classification.

9. The method of claim 8, wherein the predominant color is identified by applying a detection rule to randomly-selected pixels in the strip.

10. The method of claim 9, wherein the detection rule minimizes the probability of at least one of a false-positive outcome and a false-negative outcome.

11. The method of claim 1, wherein the classification is performed in a single pass.

12. Apparatus for processing a digital image, the apparatus comprising:

a buffer for storing blocks of the image, block and buffer size being substantially smaller than size of the image; and a processor for classifying the blocks for compression, at least some of the blocks being classified according to their number of distinct colors, the processor performing edge detection on each block whose number of distinct colors exceeds a threshold.

13. The apparatus of claim 12, wherein the processor classifies each block by comparing the number of distinct colors to the threshold; and wherein the processor codes a color pattern of each block whose number of distinct colors does not exceed the threshold.

14. The apparatus of claim 13 wherein the processor classifies a block for lossy high quality compression if the threshold is exceeded and at least one edge is detected; and wherein the processor classifies a block for lossy low quality compression if the threshold is exceeded and at least one edge is not detected.

15. The apparatus of claim 12, wherein the processor performs edge detection by determining an entropy of luminance differences in the block.

16. The apparatus of claim 12, wherein the processor identifies at least one predominant color in a strip of blocks prior to classification.

17. The apparatus of claim 16, wherein the processor identifies a predominant color by applying a detection rule to randomly-selected pixels in the strip.

18. The apparatus of claim 17, wherein the processor determines at least one predominant color for each strip of the image.

19. The apparatus of claim 17, wherein the detection rule minimizes the probability of at least one of a false-positive outcome and a false-negative outcome.

20. An article for a processor, the article comprising computer memory; and
a program stored in the memory, the program, when executed, instructing the processor to process a digital image by accessing a plurality of blocks of the digital image, block size being substantially smaller than size of the image; classifying each block for compression, at least some blocks being classified according to their numbers of distinct colors; and performing edge detection on each block whose number of distinct colors exceeds a threshold.

21. The article of claim 20, wherein the number of distinct colors in a block is determined by determining the number of distinct color vectors in the block.

22. The article of claim 20, wherein the number of distinct colors in a block is determined by determining the number of distinct truncated color vectors in the block.

23. The article of claim 20, wherein the number of distinct colors in a block is determined by determining the number of bins filled with color vectors.

24. The article of claim 20, wherein the method further comprises coding a color pattern of a block if the threshold is not exceeded.

25. The article of claim 20, wherein a block is classified for lossy high quality compression if the threshold is exceeded and an edge is detected, the block being classified for lossy low quality compression if the threshold is exceeded and at least one edge is not detected.

26. The article of claim 20, wherein the edge detection on a block is performed by determining an entropy of differences in the block.

* * * * *